(12) United States Patent
Phelps, Sr.

(10) Patent No.: US 12,129,790 B1
(45) Date of Patent: *Oct. 29, 2024

(54) POWER PLANT CYCLE FOR A NEW RENEWABLE ENERGY OR OTHER HEAT SOURCE FACILITATED BY A SUPERSONIC SHOCK WAVE COMPRESSOR APPARATUS

(71) Applicant: Calvin E. Phelps, Sr., Easton, PA (US)

(72) Inventor: Calvin E. Phelps, Sr., Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,518

(22) Filed: Feb. 6, 2024

Related U.S. Application Data

(63) Continuation-in-part of application No. 18/522,482, filed on Nov. 29, 2023.

(60) Provisional application No. 63/466,492, filed on May 15, 2023.

(51) Int. Cl.
| | | |
|---|---|---|
| *F04D 21/00* | (2006.01) | |
| *F01D 15/10* | (2006.01) | |
| *F01D 19/00* | (2006.01) | |
| *F02C 1/08* | (2006.01) | |
| *F02C 1/10* | (2006.01) | |
| *F02C 6/00* | (2006.01) | |

(52) U.S. Cl.
CPC .............. *F02C 6/00* (2013.01); *F01D 15/10* (2013.01); *F01D 19/00* (2013.01); *F02C 1/08* (2013.01); *F02C 1/10* (2013.01); *F04D 21/00* (2013.01)

(58) Field of Classification Search
CPC ...... F02C 6/00; F02C 1/08; F02C 1/10; F02C 1/05; F01D 19/00; F01D 25/00; F04D 21/00; F01K 27/00; F03G 4/00; F03G 4/001; F03G 4/02; F03G 4/029; F03G 6/00

See application file for complete search history.

(56) References Cited

U.S. PATENT DOCUMENTS

| | | | | |
|---|---|---|---|---|
| 2,975,587 | A * | 3/1961 | Rae ........................... | F02C 7/04 138/44 |
| 2011/0252796 | A1* | 10/2011 | Burkhart ................. | F01K 27/00 60/641.2 |
| 2019/0170025 | A1* | 6/2019 | Phelps, Sr. ................ | F25B 9/06 |
| 2020/0182095 | A1* | 6/2020 | Cirucci ............... | F28D 20/0034 |
| 2021/0332752 | A1* | 10/2021 | Williams ............. | H02J 15/006 |

* cited by examiner

*Primary Examiner* — Thomas P Burke
(74) *Attorney, Agent, or Firm* — James R McDaniel

(57) ABSTRACT

A new power plant cycle that does not condense the vapor leaving the turbine facilitated by an innovative vapor compression apparatus to repressurize the vapor with heat input to the cycle from a new renewable energy or other heat source. The new cycle can be used in place of the conventional low efficiency Rankine cycle to provide economical production of electricity. Using the cycle with heat input from a fossil fuel would reduce air pollution from this source to a fraction of current emissions.

22 Claims, 7 Drawing Sheets

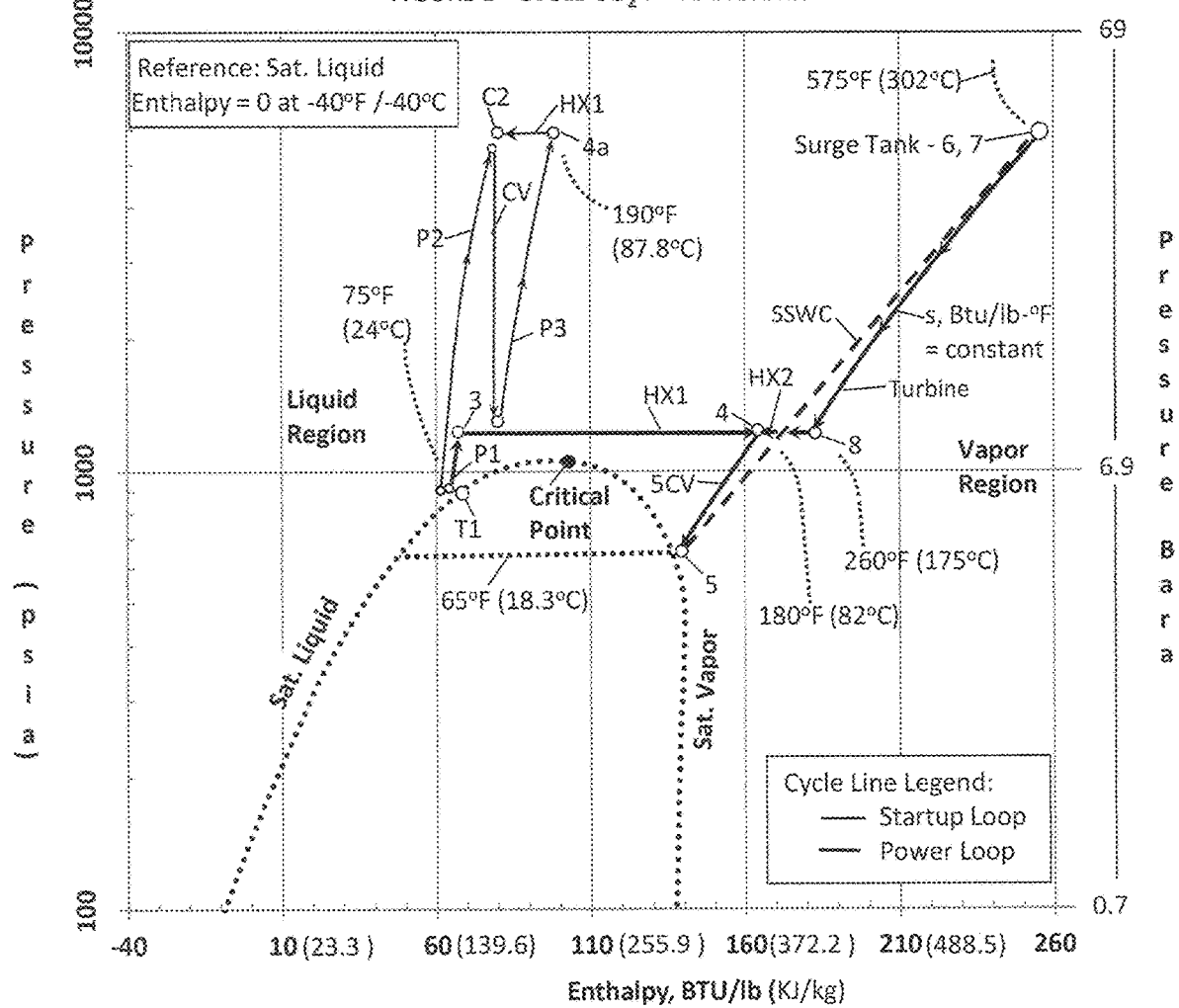

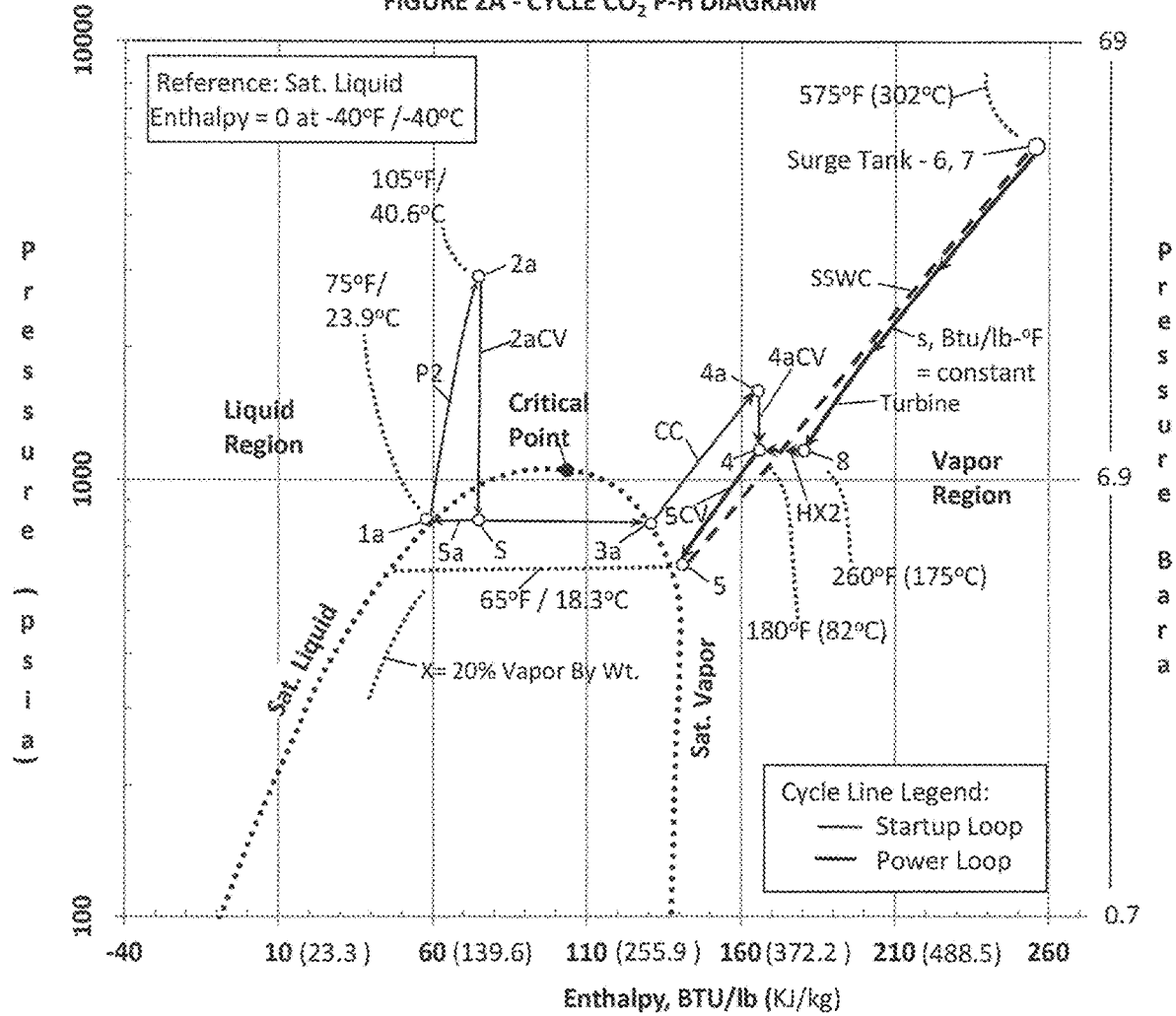

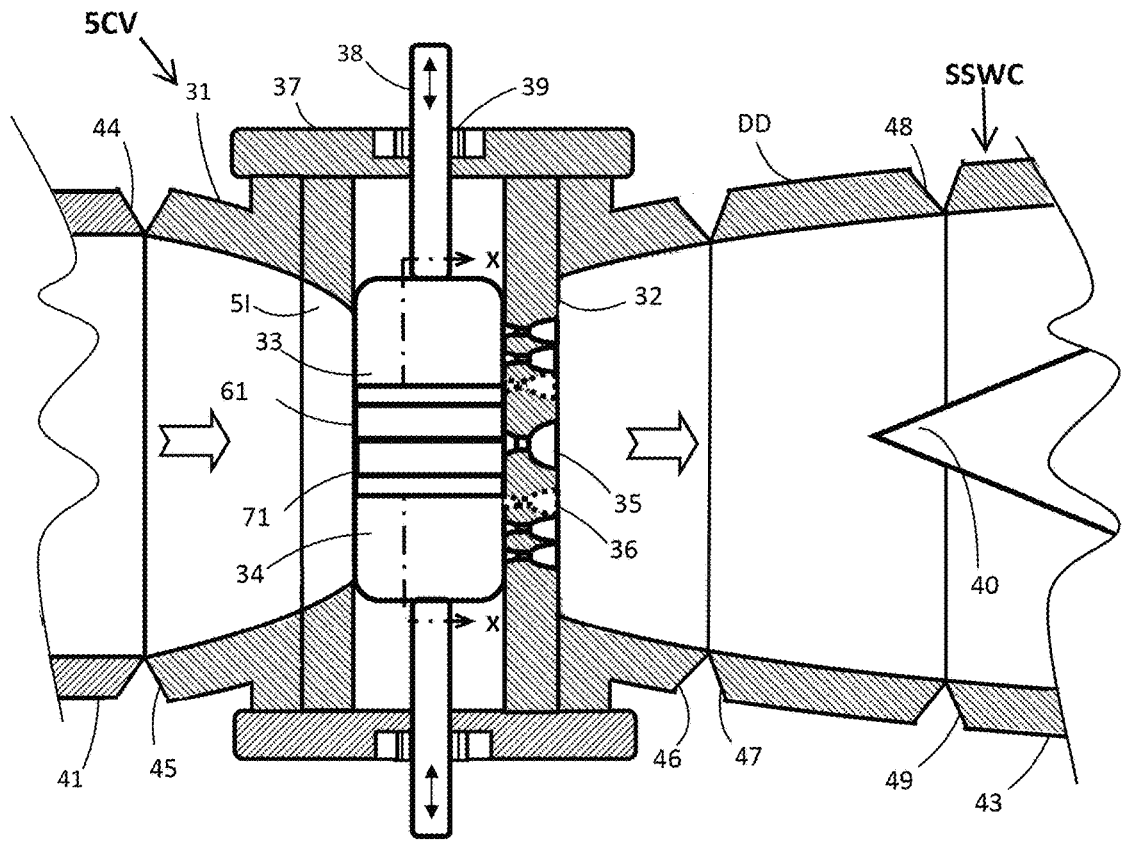
FIG. 3
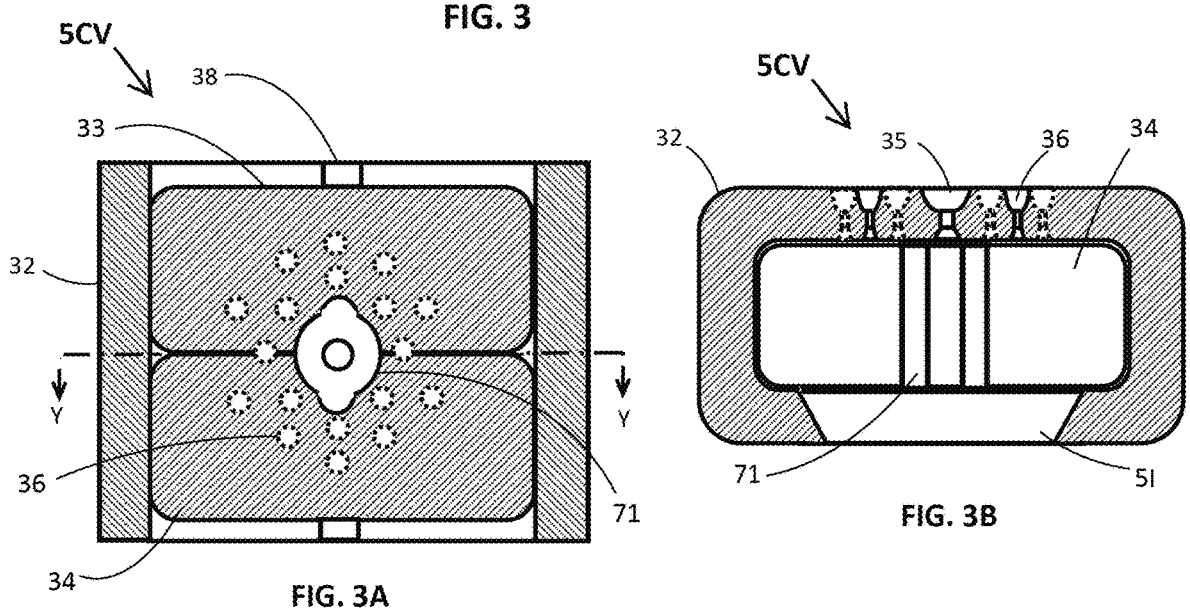
FIG. 3A
FIG. 3B

POWER PLANT CYCLE FOR A NEW RENEWABLE ENERGY OR OTHER HEAT SOURCE FACILITATED BY A SUPERSONIC SHOCK WAVE COMPRESSOR APPARATUS

CROSS-REFERENCE TO RELATED APPLICATION

This application is a continuation-in-part of U.S. patent application Ser. No. 18/522,482, filed on Nov. 29, 2023, which claims benefit of U.S. Patent Application No. 63/466,492, filed on May 15, 2023, the disclosures of which are hereby incorporated by reference in their entirety to provide continuity of disclosure to the extent such disclosures are not inconsistent with the disclosure herein.

FIELD OF THE INVENTION

The disclosed novel power plant cycle uses a novel renewable energy, or other heat source, without condensing the vapor leaving the turbine that is facilitated by an innovative vapor compression apparatus to repressurize the vapor; thereby, facilitating a novel method for the production of electricity. The other heat source may include, but is not limited to renewable energy, fossil fuels, nuclear energy, geothermal sources, solar heat, waste heat, electric heat, or other low temperature heat sources.

A conventional stationary power plant using the Rankine cycle loses about 50% plant efficiency due to heat rejection to the environment when the vapor leaving a turbine is condensed so that liquid pumps can restore pressure to the cycle. Conversely, in one embodiment of the present invention, the vapor leaving the turbine is not condensed and the compression apparatus restores vapor pressure to the cycle. Since the compression apparatus minimizes consumption of auxiliary power, net power plant output is further increased. The power savings advantage offered by this novel invention may be applied in other applications such as carbon capture and storage (CCS) applications.

Since the power plant cycle of the present invention does not condense vapor, most of the equipment and piping used in the conventional power plant Rankine cycle would not be required, including the condenser system and cooling tower. Also, boiler designs would be less complex and less high temperature materials would be required. Finally, power plants using the novel power plant cycle of the present invention can be independently located from water sources for condenser coolant.

Currently, supersonic shock wave compressors compress the combustion air for in-flight supersonic and hypersonic aircraft based on Ramjet technology. When the aircraft exceeds the speed of sound and the flow of incoming combustion air to the engines exceeds supersonic velocity, the impinging air onto the inlet cowl and cone or wedge creates shock waves; thereby, additively compressing the air with each of the oblique shock waves and when encountering subsonic velocity air flow after a normal shock wave at the throat prior to entering the downstream flow. Advancements in these aircraft engine designs now include adjustable cowls and more complex cone or wedge surfaces to generate multiple oblique shock waves, along with axially adjustable cones or wedge angles to optimize production of oblique sonic waves and compression. Since these aircraft do not use a rotary compressor, the magnitude of compression is dependent on the entering air velocity, which must be greater than the speed of sound (c), or Mach number (M) greater than 1. Higher air inlet Mach number velocities produce higher compression.

In one embodiment, the compression apparatus disclosed for the power plant cycle of the present invention includes a conventional supersonic wave compressor (SSWC) which is currently used to compress combustion air in supersonic aircraft engines while the aircraft is flying. A unique aspect of the present invention is that to facilitate compression by the SSWC in a stationary power plant, a choke valve or other conventional velocity choking device is located upstream of the SSWC to transition the gas flowing at subsonic velocity to supersonic velocity entering the SSWC to simulate aircraft speed greater than Mach 1. The choke valve uses a cylindrical or rectangular shaped plug with a cage around the plug that includes one or more exit ports consisting of convergent-divergent (CD) nozzles. Also, in one embodiment of the present invention, the plug travel is controlled to provide port openings that can be used to control choke velocity in relation to gas flow; thereby, continuously transitioning the gas entering the SSWC to supersonic velocity. Another unique aspect of the present invention is that if one compression apparatus set, comprised of a choke valve, connecting divergent pipe, and a SSWC does not adequately compress the gas to the desired pressure, additional sets can be installed in series, as necessary.

The heat input to the cycle is from a new renewable energy consisting of pump heat of compression. Other renewable energy or conventional source heat inputs can be used as well.

A still another unique aspect of the present invention is that power plant cycles in stationary power plants with supersonic shock wave compression would provide economical production of electricity and air pollution from fossil fuel plants would be reduced to a small fraction of that currently produced.

BACKGROUND OF THE INVENTION

In 2008, the U.S. Department of Energy partnered with Ramgen Power Systems and the Dresser-Rand business in a co-funding project to adapt Ramjet flight-based SSWC to CCS applications requiring large $CO_2$ compression ratios to increase the pressure near atmospheric pressure to about 2200 psia. Supersonic shock wave compression was proven successful by the project with the use of a specially designed rotating impeller to create shock waves in the stream of $CO_2$ flowing in at subsonic velocity which compressed the air from about 20 psia to 240 psi, or at a 12:1 compression ratio. The test resulted in compression power savings and in beneficial heat recovery, but the rotating impeller consumed a significant amount of auxiliary power. Therefore, it would be desired if the compression apparatus did not use a rotating impeller to consume power. Furthermore, it would be desired if the CCS would be more economically viable by using a compression apparatus downstream of the stationary Ramgen compressor, or a conventional compressor, to enable compression.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 2 is a P-H diagram depicting the power plant cycle, according to one embodiment of the present invention;

FIG. 2A is a P-H diagram depicting the power plant cycle with the alternate startup loop, according to one embodiment of the present invention;

FIG. 3 is a cutaway view of a velocity chocking valve, according to one embodiment of the present invention;

FIG. 3A is a cross-sectional view of the velocity chocking valve, taken along lines X-X in FIG. 3, according to one embodiment of the present invention;

FIG. 3B is another cross-sectional view of the velocity chocking valve, taken along lines Y-Y in FIG. 3A, according to one embodiment of the present invention;

BRIEF SUMMARY OF THE INVENTION

In one embodiment of the present invention, the power plant cycle (C), using a new renewable energy or other available heat source without vapor condensation leaving the turbine, is facilitated by a novel vapor compression apparatus to repressurize the vapor. The new renewable energy source is provided by pump heat of compression (HOC). In particular, the novel compression apparatus consists of a supersonic shock wave compressor (SSWC). As discussed above, since the SSWC requires the entering air to be at or above supersonic velocity, the SSWC is adapted to stationary service by including a velocity choking device to provide supersonic velocity vapor to the SSWC to facilitate compression.

In general, the power plant cycle consists of a startup loop and a power loop. The startup loop portion of the power plant cycle consists of two streams of liquid carbon dioxide ($CO_2$) to provide mass flow, a starting pressure, and heat input from pump HOC to the power loop. However, it is to be understood that any suitable heat trapping gas that performs similarly to $CO_2$ can also be used. The first stream includes a set of pumps in series receiving liquid from a tank storing $CO_2$ at saturation pressure, which then elevate the pressure to a supercritical pressure liquid to produce HOC for heat transfer to the power loop in an indirect heat exchanger located upstream of the compression apparatus. The second stream includes a second pump receiving $CO_2$ from the storage tank, which then elevates the pressure to a supercritical pressure just above critical pressure for entering the power loop and the indirect heat exchanger to absorb heat from the first stream; thereby, providing a preliminary starting mass flow, pressure, and temperature to the compression apparatus. The startup loop portion of the power plant cycle continues increasing the mass flow to a vapor compression apparatus located within the power loop until compression is facilitated within the vapor compression apparatus and a desired base load is achieved by the cycle.

Figure 1:
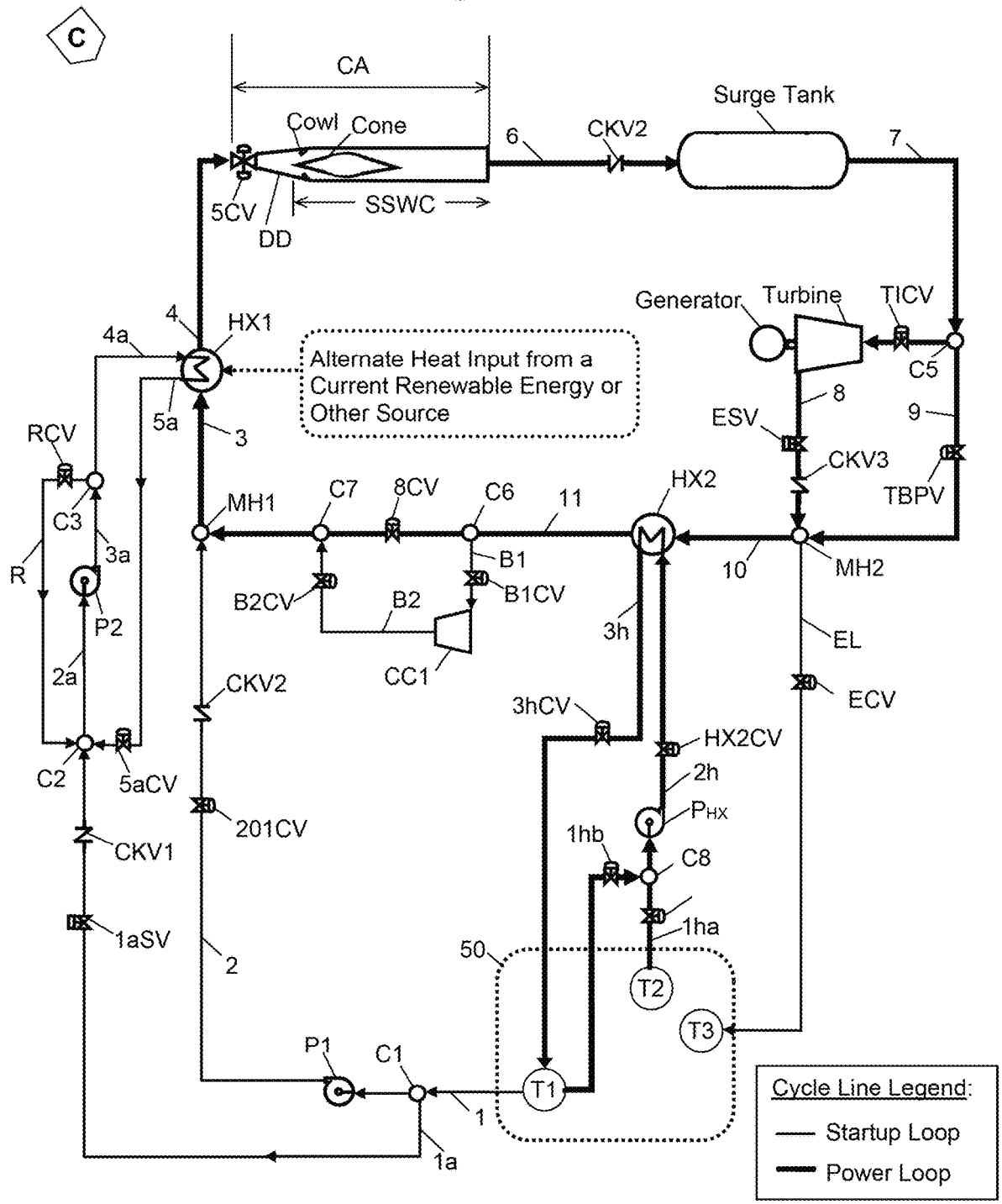
FIG. 1 is a flow diagram depicting the power plant cycle, according to one embodiment of the present invention.
Figure 1A:
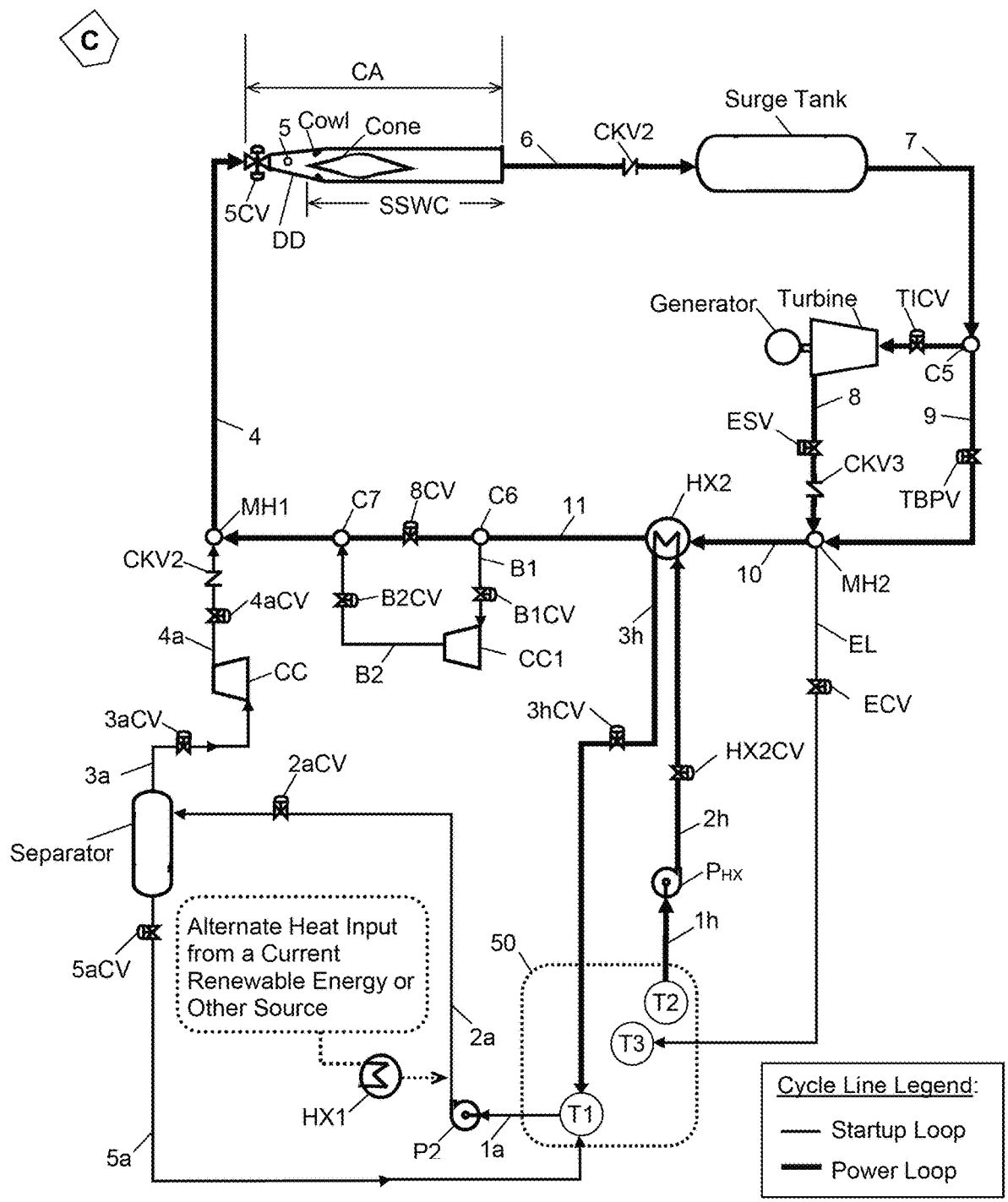
FIG. 1A is a second flow diagram depicting an alternate startup loop, according to one embodiment of the present invention.

The power loop portion of the power plant cycle starts at a mix header in which the vapor leaving the turbine is combined with the second stream of the startup loop portion. The power loop portion includes the vapor compression apparatus, one or more surge tanks, a turbine-generator set, and indirect heat exchangers. The vapor compression apparatus includes a velocity choking device with an outlet divergent duct connected to the inlet of the SSWC. To ensure that the pressure reduction required to control choke velocity does not create a low temperature vapor or subcritical mixture entering the SSWC, the preliminary enthalpy and pressure provided by the startup loop portion second stream to the power loop velocity choking device should be at values to avoid these conditions. Before the compressor apparatus facilitates compression in the power loop, a conventional compressor in the startup loop restores pressure to the cycle equivalent to the choking device pressure reduction to control Mach 1 throat velocity. After the compressor apparatus compresses vapor as designed, the conventional compressor CC1 can be transitioned from service by opening 8CV and closing B1CV and B2CV (FIGS. 1 and 1A).

In another embodiment of the present invention, the startup loop portion, includes conventional compressor CC1 to restore the pressure and temperature in the power loop to avoid creating a saturated mixture or low temperature vapor entering the SSWC after pressure reduction by the velocity choking device, and also provides supplemental HOC to startup pump P2 HOC when the vapor conditions are suitable to enter CC1.

In another embodiment of the present invention, an alternate for the startup loop portion includes starting with a $CO_2$ vapor and not liquid $CO_2$. The vapor source quality, including purity and particulate content, can be found in manufacturing plants that produce liquid $CO_2$ as a product for transport. The vapor can be conditioned to the required inlet pressure, temperature, and enthalpy of the power loop; thereby, avoiding liquid $CO_2$ for startup, except for the cooling or heating portion for the vapor leaving the turbine.

To heat the $CO_2$ vapor leaving the turbine, the vapor leaving the turbine is taken from tank T1 through line 1hb and control valve 1hbCV, connection C8, and line 1h to $P_{HX}$, in which the pressure is elevated from 900 psia to about 2000 psia to provide a 10° F. approach temperature to the vapor leaving the turbine. The heating $CO_2$ temperature is reduced in HX2 so that isenthalpic pressure reduction by control valve 3hCV creates a liquid near saturated conditions for return to tank T1 through line 3h and control valve 3hCV.

One or more surge tanks are located between the compression apparatus and turbine to maintain a sufficient volume of $CO_2$ to minimize pressure fluctuations, and to minimize large pressure and thermal shocks to the turbine in the event of compression loss. In the event of a power plant trip, an emergency operated shut-off valve located downstream of the turbine is quickly closed to isolate the turbine with the surge tank (ST). If external or stored power is unavailable during a power plant trip, emergency backup power should be included for the emergency shut-off valve.

Flow is routed from the surge tank to the turbine, which isentropically expands the vapor to produce electricity with a shaft-connected generator. The vapor leaving the turbine is routed through an indirect heat exchanger for controlling the temperature and then to the mixing header to recombine with the first stream of the startup loop portion. The heat exchanger controls the vapor temperature, in conjunction with the startup loop portion, to near starting conditions entering the compression apparatus. The startup loop portion of the power plant cycle continues to charge the power loop, as discussed earlier, until a desired base load or full load is established; after which, the startup loop portion can be placed in standby mode, since the compression apparatus sustains a desired power loop pressure.

A turbine bypass is provided to ensure that vapor does not enter the turbine until the inlet vapor conditions are suitable. Using the turbine bypass in parallel with turbine operation also provides flow control and compression stability, since maintaining a recirculation mass flow provides more flow to the compression apparatus and increases the compression control range.

In another embodiment of the present invention, atmospheric air is used as the heat trapping gas as currently used by supersonic aircraft engines. This cycle provides for a less complex startup loop in a power plant. Since purchasing and maintaining of air is not required, the tank storage and pumping area is eliminated. Also, the startup system only requires a conventional air compressor to charge the power loop with flow, pressure, and HOC. The pumps, indirect heat exchangers, and the associated piping and valves are not required.

In another embodiment of the present invention using atmospheric air, this invention may be used on sub-sonic aircraft to provide auxiliary power and thrust to reduce fuel consumption and air pollution.

DETAILED DESCRIPTION OF THE INVENTION

Now attention is directed to FIGS. 1 and 2 which illustrate the cycle (C) to produce electricity with new renewable energy provided by pump heat of compression, or other renewable energy or conventional heat sources. It is to be understood that the power plant cycle depicted on the figures uses light weighted solid lines for the startup loop portion and heavier weighted solid lines for the power loop portion (FIGS. 1 and 1A). The P-H diagrams (FIGS. 2 and 2A) show the power plant cycle pressure, temperature, enthalpy, entropy, and phase conditions using $CO_2$.

Startup Loop

The startup loop of the cycle consists of two flow streams. The first stream using heat input from pump HOC is initiated with $CO_2$ saturated liquid received in line 1 from tank T1 in storage and pumping area 50 to header connection C1, and then through line 1a, control valve 1aCV, stop-check valve 1aSCV, header connection C2, and line 2a to the inlet of pump P2 located at an elevation to provide a net positive suction head to the pump P2. The pressure is increased by P2 from T1 storage saturated pressure of 900 psia to a liquid supercritical pressure of about 6000 psia.

P2 outlet flow is routed through line 3a, pressure reducing control valve CV, pump P3, line 4a, and indirect heat exchanger HX1; and then returned to P2 inlet through line 5a, flow control valve 5aCV and header connection C2. Valve CV isenthalpically reduces the recirculation pressure from 6000 psia to near 1200 psia to decrease the supercritical liquid entropy entering P3 for a second isentropic pressure elevation to about 6000 psia, resulting in a higher enthalpy and temperature available for transferring heat to the power loop flowing through HX1. In other words, pump P2 receives liquid $CO_2$ from a storage tank T1 storing $CO_2$ at saturation pressure, such that the pump P2 then elevates a pressure of the liquid $CO_2$ to a supercritical pressure liquid to produce HOC with more enthalpy, then isenthalpically reduces the pressure through control valve CV for routing to a second pump P3 in series, such that the second pump P3 then elevates a pressure of the liquid $CO_2$ to a supercritical pressure liquid to produce HOC at a higher enthalpy for heat transfer to the power loop in an indirect heat exchanger HX1 located upstream of the compression apparatus CA.

The second stream of $CO_2$ in the startup loop is routed from storage tank T1 to the inlet of pump P1 through line 1 and header connection C1. P1 elevates the pressure of subcooled liquid from 900 psia to a supercritical liquid pressure of about 1200 psia and directs the flow through line 2 and control valve 201CV to mixing header MH1 to combine with the flow leaving the turbine in the power loop. The total combined flow in the power loop leaving MH1 is routed through line 3 and indirect heat exchanger HX1 to absorb pump HOC input from the first startup stream. From HX1 the flow is routed through line 4 to the inlet of the compression apparatus. Accordingly, the startup loop charges the power loop with the required mass flow, heat input, and pressure for entering the compression apparatus.

Power Loop

The compression apparatus (CA) includes a velocity choking device at the inlet, such as a choke valve (5CV), to control the critical pressure ratio and Mach 1 throat velocity to transition the entering stream velocity from subsonic to supersonic velocity at location 5. The velocity choking device outlet stream flows at supersonic velocity into a divergent duct DD at location 5 that allows the velocity to increase more before flowing into the connected inlet of the SSWC to facilitate compression. The SSWC can use a cowl at the inlet to direct shock waves onto an angled surface, such as a cone, for creating shock waves and compression. The cowl may be adjustable and the cone may have axially adjusted positions to increase the turndown range of the compression apparatus. The SSWC is a conventional device and forms the compression apparatus with the velocity choking device (5CV) and the connecting divergent duct (DD). A unique aspect of the compression apparatus is that it adapts a SSWC designed for compression of combustion air in moving supersonic aircraft engines to stationary compression service.

A unique aspect of the present invention is that the compression apparatus can also be used in other stationary technology applications such as carbon capture and storage (CCS), vehicle charging stations, $CO_2$ conditioning, $CO_2$ liquid manufacturing, gas turbine-generator combustion air technology, adapting supersonic aircraft engines to stationary power plants for a quick on-line schedule, or the like.

The power loop mass flow is increased until choke velocity is achieved in the throat of the 5CV at the minimum plug position to enable supersonic velocity to the SSWC to activate compression. In the power loop the pressure from P1 must be about 1200 psia and the enthalpy increased to about 145 Btu/lb to avoid creating a saturated mixture or a low vapor temperature in the SSWC, since the 5CV isentropically reduces pressure to create choke velocity. The flow velocity in line 4 is subsonic (M<1) and the 5CV is controlled for a CD nozzle throat choke velocity (M=1) to transition the outlet to supersonic velocity (M>1). The compression apparatus should compress the vapor to the turbine set point pressure and temperature. Otherwise, one or more compression apparatus should be located in series downstream of the first compression apparatus. If a greater compression apparatus turndown range is required, one or more compression apparatus may be installed in parallel. Before the compression apparatus facilitates compression in the power loop, conventional compressor CC1 restores pressure to the cycle equivalent to the 5CV pressure reduction to control Mach 1 velocity. With 8CV closed, CC1 receives vapor from header connection C6 in line 11 through line B1 and control valve B1CV. From CC1, the vapor is returned to the power loop through line B2, control valve B2CV, and header connection C7. After the compression apparatus compresses vapor as designed. CC1 can be transitioned from service by opening 8CV and closing B1CV and B2CV.

In cases when pressure vessel design pressure or the specified gas flow causes excessive wall thicknesses, materials can be selected with a higher allowable stress, or the turbine throttle design pressure can be reduced. Outside temperature jacketing can be used to reduce cyclic stresses, but excessive wall thicknesses can cause a design with less than the specified life cycles. One or more trains of compression apparatus can be installed in parallel to reduce the gas flow, thereby resulting in less diameter and wall thicknesses. Using more than one compression apparatus in parallel also increases the operating turndown range of the compression apparatus and power plant. The cone, or other flow obstruction, can have internal compartments, drills, or other means to reduce the pressure differential between the internal pressure and the external pressure, thereby resulting in less material thicknesses.

In the event of a trip condition and the surge tank ST has insufficient volume of $CO_2$ to restart the cycle (C), CC1 would be placed back into service to restart the cycle. If the cycle is offline for an extended time period in which the $CO_2$ vapor is below conditions required for CC1, the cycle (C) should be evacuated through line EL and control valve ECV from MH2 to storage tank T3 in area 50 for reconditioning of the $CO_2$ vapor, which can include a compression apparatus.

Alternative Startup Loop

The alternate startup loop is depicted in FIG. 1A and FIG. 2A. Pump P2 receives a subcooled liquid in line 1a from storage tank T1 operating at 800 psia saturation pressure. To provide pump HOC, P2 elevates the pressure to about 2000 psia and the outlet is routed to vapor separator S through line 2a and pressure reducing control valve 2aCV, which isenthalpically reduces the pressure to 810 psia to create a subcritical saturated mixture of about 20% vapor by weight. The vapor from vapor separator S is routed to a conventional compressor CC through line 3a and pressure reducing control valve 3aCV, which isentropically compresses the vapor to about 1200 psia and the outlet is routed to MH1 through line 4a, control valve 4aCV, and check valve CKV2 to combine with vapor leaving the turbine in the power loop. The total combined flow in the power loop leaving MH1 is routed to the inlet of the compression apparatus. After which, the power loop remains the same. If desired, HX1 can be relocated to the startup loop downstream of P2 to provide supplemental heat to pump HOC from a renewable energy or conventional heat source. The separated saturated liquid is returned from separator S to storage tank T1 in line 5a through level control valve 5aCV. A unique aspect of the present invention is that the alternate startup loop charges the power loop with P2 and CC heats of compression, the initial pressure to the compression apparatus, and the mass flow. After the power loop is operating at a base load or full load, the startup loop is idle and can be placed on standby.

As further shown in FIG. 1A, the compression apparatus outlet flow is routed through line 6 and check valve CKV2 to one or more surge tanks ST and then through line 7, header connection C5, the turbine inlet control valve TICV, and to the turbine inlet. Another unique aspect of the present invention is that the turbine isentropically expands the vapor to produce electricity with the connected generator for distribution.

The vapor leaving the turbine is routed through line 8, emergency stop valve ESV, check valve CKV3, mixing header MH2, line 10, indirect heat exchanger HX2, line 11, header connection C6, control valve 8CV, and header connection C7 to combine with the startup loop vapor in mixing header MH1. The combined vapor in line 4 should be near 5CV inlet starting conditions, requiring an indirect heat exchanger HX2 to control the temperature of the vapor leaving the turbine. The power plant cycle C continues as described with the startup system adding heat input and mass flow until base load output from the cycle is achieved and is operating only on the power loop portion of the cycle. The startup portion of the cycle is then idle and can be placed into standby mode for load increases.

During a startup, as shown in FIGS. 1 and 1A, turbine bypass flow is routed from header connection C5 through line 9 and turbine bypass valve TBPV to mixing header MH2 and around the power loop until vapor conditions are suitable for introducing to the turbine through the TICV. After startup, the turbine bypass flow can be used in parallel with the turbine flow to provide more flow to the compression apparatus for increasing the compression control range.

The surge tank ST, as shown in FIGS. 1 and 1A, minimizes pressure fluctuations or pressure-temperature shocking conditions in the event of a pressure loss from the compression apparatus. For trip conditions, fast acting shutoff valve ESV in line 8 isolates the turbine with the surge tank ST to minimize turbine shocking.

The $CO_2$ to cool or heat the vapor leaving the turbine in HX2 is taken from either tank T1 or T2, depending on whether the temperature is lower or higher than required for the compression apparatus. The pressure leaving $P_{HX}$ will be controlled based on the temperature leaving the turbine in order to provide about a 10° F. approach temperature in HX2 to the temperature of the vapor leaving the turbine, depending on whether the vapor should be cooled or heated. The coolant to HX2, as shown in FIGS. 1 and 1A, is taken through line 1ha, connection C8, control valve 1haCV, and line 1h from storage tank T2 operating at a saturation pressure of 575 psia to pump $P_{HX}$ to elevate the subcooled liquid pressure to about 910 psia, which then flows through line 2h, control valve HX2CV and HX2. The coolant temperature is increased in HX2 so that the isenthalpic pressure reduction by control outlet valve 3hCV creates a liquid near saturation conditions for routing to tank T1 through line 3h and control outlet valve 3hCV. Another unique aspect of the present invention is that the described coolant circuitry cools the vapor leaving the turbine with excess heat available in T1 for plant usage, including temperature maintenance of area 50, reconditioning, plant heating, or dissipation to the environment. To heat the $CO_2$ vapor leaving the turbine, the vapor leaving the turbine is taken from tank T1 through line 1hb and control valve 1hbCV, connection C8, and line 1h to $P_{HX}$, in which the pressure is elevated from 900 psia to about 2000 psia to provide a 10° F. approach temperature to the vapor leaving the turbine. The heating $CO_2$ temperature is reduced in HX2 so that isenthalpic pressure reduction by control outlet valve 3hCV creates a saturated liquid for return to tank T1 through line 3h and control outlet valve 3hCV. Since $P_{HX}$ consumes auxiliary power, the plant net power output will be reduced accordingly.

A further unique aspect of the present invention is that other renewable energy or conventional heat input sources may be used with the power plant cycle as depicted in FIGS. 1 and 1A:

The startup loop heat input to HX1 by the first stream depicted with light weighted solid lines using P2 and P3 (FIG. 1) pump HOC would be omitted.

An alternate heat input from other renewable energy or conventional sources is added to HX1 as noted in the text box with a dotted line boundary and dotted line arrow to HX1 (FIGS. 1 and 1A).

Otherwise, the cycle and description remain the same.

The alternate startup loop depicted in FIGS. 1A and 2A with P2 and P3 HOC would be modified by changing the location of HX1 from the power loop to the startup loop between P2 and separator S so that an alternate heat input from a current renewable energy or other conventional source can replace pump HOC as noted by FIG. 1A text box (TB) with a dotted line boundary and the dotted line arrows.

Otherwise, the cycle and description for the alternate startup loop remains the same.

With respect to FIG. 2, there is illustrated a graphical depiction of the calculation values and results for the sample calculation below estimating full load net power production, Pn:

Assumptions:
Full load supercritical vapor mass flow to turbine, $\dot{m}1 = 6.0 \times 10^6$ lb/hr Since the startup loop is on standby and P1, P2 and P3 are not operating, assume that conditions entering the power loop in line 4 are as follows:
P=1200 psia
T=200° F.
h=170 Btu/lb Critical pressure ratio calculation for choked flow with $CO_2$ vapor for supersonic vapor velocity leaving the VCV:

$$Pc/Po = [2/(\gamma+1)]^{\gamma/\gamma-1}$$

Where, Pc=critical pressure
Po=upstream static pressure
$\gamma$=specific heat ratio=1.27 in the cycle operating temperature range $Pc/Po=(2/(2.27))^{4.7}=0.55$
Pressure reduction by $5CV=0.55 \times 1200=660$ psia Therefore, the 5CV isentropically reduces the pressure to 660 psia at a temperature of 65° F. and entropy of 0.185 Btu/lb-OF to control choke velocity and transition the subsonic vapor velocity to supersonic velocity. The $CO_2$ does not enter the subcritical mixture phase and the temperature is acceptable to enter the SSWC at this pressure and enthalpy condition.

Conditions resulting with SSWC non-isentropic compression from 660 psia to 6000 psia with reduced HX2 cooling:
h=255 Btu/lb
T=575° F.
Entropy, S=0.150 Btu/lb-° F.
Turbine efficiency, $\eta_T$=85%
Generator efficiency, $\eta_G$=98%

As an example to show plant net power production (Pn), the turbine isentropically expands the $CO_2$ from a pressure of 6000 psia and enthalpy of 255 Btu/lb to a pressure of 1200 psia and enthalpy of 185 Btu/lb, resulting in an enthalpy differential $\Delta h_T$ of 70 Btu/lb for work.

Net plant power production, $Pn = MW_T - P_{HX}$ where, $MW_T$ is turbine-generator gross power production and $P_{HX}$ is auxiliary power consumed by the coolant loop pump ($P_{HX}$).

Turbine-generator power production in megawatts, $MW_T$:

$$MW_T = (\dot{m}1 \times \Delta h_T \times \eta_T \times \eta_G)/3412 \times 10^3 \text{ MW/Btu}$$

$$= (6.0 \times 10^6 \text{ lb/hr} \times 70 \times 0.85 \times 0.98)/3412 \times 10^3$$

$$MW^T = 102.53$$

The startup loop is in standby mode and P1, P2, and P3 are not consuming auxiliary power, which increases Pn. To calculate auxiliary power consumption by the coolant loop pump $P_{HX}$:

Power loop enthalpy reduction leaving turbine, $\Delta h_{PL}$=185-170=15 Btu/lb Assume the coolant is taken from a storage tank operating at a saturated pressure of 550 psia and the subcooled liquid is pumped to 910 psia. The enthalpy increases in HX2 and transitions back to a saturated liquid at 900 psia after isenthalpic pressure reduction to 550 psia, $\Delta h_{LC}$=70-46=24 Btu/lb.

Coolant mass flow, $\dot{m}_{LC}$
HX2 heat balance:
($\dot{m}_{LC} \times \Delta h_{LC}) = \Delta h_{PL} \times \dot{m}1$
$24\dot{m}_{LC} = 6.0 \times 10^6 \times 15$
$24 \dot{m}_{LC} = 90 \times 10^6$
$\dot{m}_{LC} = 3.75 \times 10^6$ lb/hr $BHP = (Q \times H \times SG)/(3960 \times \eta_P)$, where
Q=water flow in gallons per minute, gpm
$Q = \dot{m}_{LC}/(8.02 \times \text{density}) = 3.75 \times 10^6/(8.02 \times 62.4) = 7,493$ gpm water
H=head, ft water$=144/62.4 \times (Pd-Pi) = 2.31 \times (910-585) = 750.75$ ft
$BHP = (7,493 \times 750.75 \times 0.89)/(3960 \times 0.9) = 1404.8$
Average $CO_2$ density=55.5 (specific gravity, SG=55.5/62.4=0.89)
$\eta_P$=assumed pump efficiency=90%
$P_{HX}$. MW=$1404.8 \times 0.746$ kW/hp=1048 kW=1.05 MW
$P_{HX}$, assuming a motor efficiency of 97%=1.08 MW The liquid coolant leaving HX2 is returned to a storage tank operating at a saturation pressure of 900 psia. Extra heat may be dissipated to the environment from the storage tank unless it is used to manage storage area 50 heat requirements, used in the cycle, or plant heating.

Therefore, $Pn = MW_T - P_{HX} = 102.53 - 1.08 = 101.45$ MW

To demonstrate capabilities of the startup loop to provide the power loop with pump heat of compression input, estimated calculations are shown below:

T1 stores $CO_2$ at 900 psia-75° F. saturated conditions

P1 elevates the pressure of the liquid from T1 at a pressure of 900 psia to the following conditions entering the power loop and HX1 for heating.
$\dot{m}1 = 2.0 \times 10^6$ lb/hr (assumed compression apparatus (CA) minimum mass flow)
P=1200 psia
T=85° F.
h=70 Btu/lb The startup $CO_2$ conditions leaving HX1 in line 4 to the power loop compression apparatus at a pressure of 1200 psia and the minimum enthalpy to avoid creating a low temperature or saturated mixture:
h=145 Btu/lb
T=130° F.
Entropy, s=0.225 Btu/lb-° F.

Therefore, the differential enthalpy for heating the $CO_2$ in the power loop, $\Delta h_{PL}$=145−70=75 Btu/lb To provide heating, P2 elevates the pressure of the liquid from T1 at a pressure of 900 psia to the following conditions:
Pressure, P=6000 psia
Temperature, T=142° F.
Enthalpy, h=82 Btu/lb To increase the startup heat input, the pressure of the liquid heating stream is reduced by control valve CV at constant enthalpy from 6000 psia to near 1200 psia to decrease the entropy, and then the pressure is isentropically elevated a second time by P3 to near 6000 psia, resulting in an enthalpy of 105 Btu/lb and temperature of 190° F.

Since the temperature to 5CV leaving HX1 is 145, and assuming a 10° F. approach temperature, the heating stream the temperature leaving HX1 should be 155° F. with an h=88. Btu/lb Therefore, the differential enthalpy of the heating stream, $\Delta h_H$=105−88=17 Btu/lb HX1 heat balance:
$\dot{m}1 \times \Delta h_{PL} = \dot{m}2 \times \Delta h_H$
$\dot{m}2 = (2.0 \times 10^6 \text{ lb/hr} \times 75 \text{ Btu/lb})/17 \text{ Btu/lb} = 8.8 \times 10^6 \text{ lb/hr}$ Therefore, the startup loop pump HOC for heating the power loop is demonstrated.

The mass flow from the startup loop is increased to achieve the minimum mass flow of the SSWC required to facilitate compression; thereby, setting the minimum base load of operation. Since the vapor conditions entering the turbine bypass are now at suitable conditions for entering the turbine, the turbine-generator set may be placed into service by transitioning the turbine bypass out of service. With the vapor leaving the turbine bypass, and then the turbine, and HX2 in service, the startup loop heat input to HX1 can be controlled accordingly in concert with the vapor temperature leaving HX2 to control temperature entering the compression apparatus.

With respect to FIGS. 3, 3A, and 3B, FIGS. 3, 3A, and 3B depict a velocity choking valve labeled as control valve 5CV on FIGS. 1 and 1A. In particular. FIG. 3 depicts the valve body 31 and the internals consisting of cage 32 and two opposing plugs 33 and 34. Cage 32 is constructed with an inlet gas flow opening 51 and exit openings consisting of center CD nozzles 35 and surrounding CD nozzles 36. Downstream of cage 32, valve body 31 and divergent duct DD (labeled DD on FIGS. 1 and 2) cross-sectional areas are expanding without internal obstructions to avoid creation of shock waves to cause loss of velocity, and allowing the supersonic velocity to further increase before encountering the leading edge 40 of the supersonic shock wave compressor (SSWC) cone.

A CD nozzle 35, 36 isentropically expands a $CO_2$ gas/vapor flowing at subsonic velocity to supersonic velocity with Mach 1 throat velocity. The CD nozzles 35 and 36 can have various shapes and lengths. The seats of the double plugs 33 and 34 can have various contours to provide balanced flow paths to the SSWC cone over the load range. SSWC is currently used in-flight technology, but the velocity choking valve depicted in FIG. 3 and the divergent duct DD are new renovations to provide a method to adapt in-flight SSWC technology to stationary compression service.

With respect to FIG. 3A, FIG. 3A is taken vertically through plugs 33 and 34. With respect to FIG. 3B, FIG. 3B is taken horizontally through FIG. 3A at the seats of plugs 33 and 34. If a CD nozzle design requires more length, cage 32 wall thickness can be increased or a nozzle plate can be attached to cage 32 to extend nozzles 35 and 36. As an alternative to the nozzle plate, part of each nozzle can be individually welded to the outside surface of cage 32. All inside surfaces of CD nozzles 35 and 36 should be smooth and metal cladding can be applied to provide smoothness and also material that is resistant to corrosion or erosion.

Valve body 31 is a gate type with weld-ends, opposing access bonnets 37, and a straight-through gas flow direction from the inlet through cage opening 51, across seat plugs 33 and 34, and through CD nozzles 35 and 36 to the outlet. Plugs 33 and 34 have minimum gas flow openings 61 and 71. CD nozzle 35 in the center of the cage 32 is larger than the other nozzles 36 to provide a minimum gas flow for the lower compression range of the compression assembly. The other nozzles 36 are arranged in a circular pattern around the center nozzle 35 to provide balanced circumferential flow to the SSWC cone (shown with leading edge 40) when the plugs are automatically controlled in opposite directions by the attached valve stems 38 and connected valve operators (not shown). The plugs are controlled to expose CD nozzles 36 to maintain Mach 1 velocity in each of the throats over a load range in direct relation to gas flow changes. Packing glands 39 are depicted to indicate pressure sealers are required for stems 38.

The inlet duct 41 weld-end 44 connects to valve body 31 weld-end 45. Weld-end 47 on divergent duct DD connects to weld-end 46 on body 31. Weld-end 48 on divergent duct DD connects to the supersonic shock wave compressor body 43 at weld-end 49. Weld protrusions should be avoided and smooth inside surfaces should be provided to avoid creating shock waves and slowing the gas velocity. The point of the leading edge 40 of the compression cone is aligned with the center of CD nozzle 35.

The SSWC depicted in FIG. 3 is designed for internal compression. Current SSWC technology is available to control the cone to various axial positions in relation to gas flow. For example, during low range operation, the cone can be moved closer to CD nozzles 35 and 36 to reduce the cross-sectional areas of the SSWC compression section and throat, thereby making an adjustable orifice for lower gas flow rates.

In cases when pressure vessel design pressure or the specified gas flow causes excessive wall thicknesses, materials can be selected with a higher allowable stress or the turbine throttle design pressure can be reduced. Outside temperature jacketing can be used to reduce cyclic stresses, but excessive wall thicknesses can cause a design with less than the specified life cycles. One or more trains of compression apparatus can be installed in parallel to reduce the gas flow, thereby resulting in less diameter and wall thicknesses. Using more than one compression apparatus in parallel also increases the operating turndown range of the compression apparatus and power plant.

Various other SSWC designs are available, including mixed compression types in which external compression is added prior to entering the SSWC by using an adjustable cowl or other shock wave focal surface to create external oblique shock waves. Also, the SSWC can have a wedge shape in lieu of a cone for internal compression using adjustable inclinations to optimize compression.

Instrumentation is currently available to ensure that each nozzle is operating at Mach 1 velocity, including gas flow, sound wave detection, static pressure, and temperature. The intelligent controller can include the following expected curves for comparison to actual measurements as feedback for correcting valve travel positions:
pressure and temperature on a Pressure-Enthalpy diagram
valve travel position versus gas flow turbine throttle pressure or turbine differential pressure versus megawatts or gas flow Valve body 31 is arranged for assembly by matching the internals to one bonnet 37 and then inserting the internals through the bonnet 37 access opening, mating the internals to the opposite bonnet 37, and then bolting both bonnets in-place to valve body 31 to secure the internals. Cage 32 is further held in-place by valve body 31.

As an example and assuming that a CD throat has a 1.5 inch diameter, the flow through one CD nozzle at Mach 1 velocity is shown below:

M, approximate mass flow, lb/hr=($\rho$)(V)(A) (3600 sec/hr), where

P=average density, lb/ft$^3$=9 lb/ft$^3$

V=velocity, ft/sec, where Mach 1=920 ft/sec

A=area, ft$^2$, where 2.5 inch diameter=0.0341 ft$^2$=4.91 in$^2$

M=9×920×0.0341×3600=1,016,452 lb/hr

Assuming a full load mass flow of 6,000,000 lb/hr, the number of CD nozzles required would be about 16.

The Mach number leaving the CD nozzle is related to the cross-sectional area ratio of the divergent nozzle exit plane to the cross-sectional area of the nozzle throat. Assuming an area ratio of 5, the velocity leaving the CD nozzle can be up to M=5 and the CD nozzle exit inside diameter would be about $d_i=[(4\times5\times1.771)/3.142)]^{1/2}$=5.6 inches with a 2.5-inch diameter throat.

Figure 4:
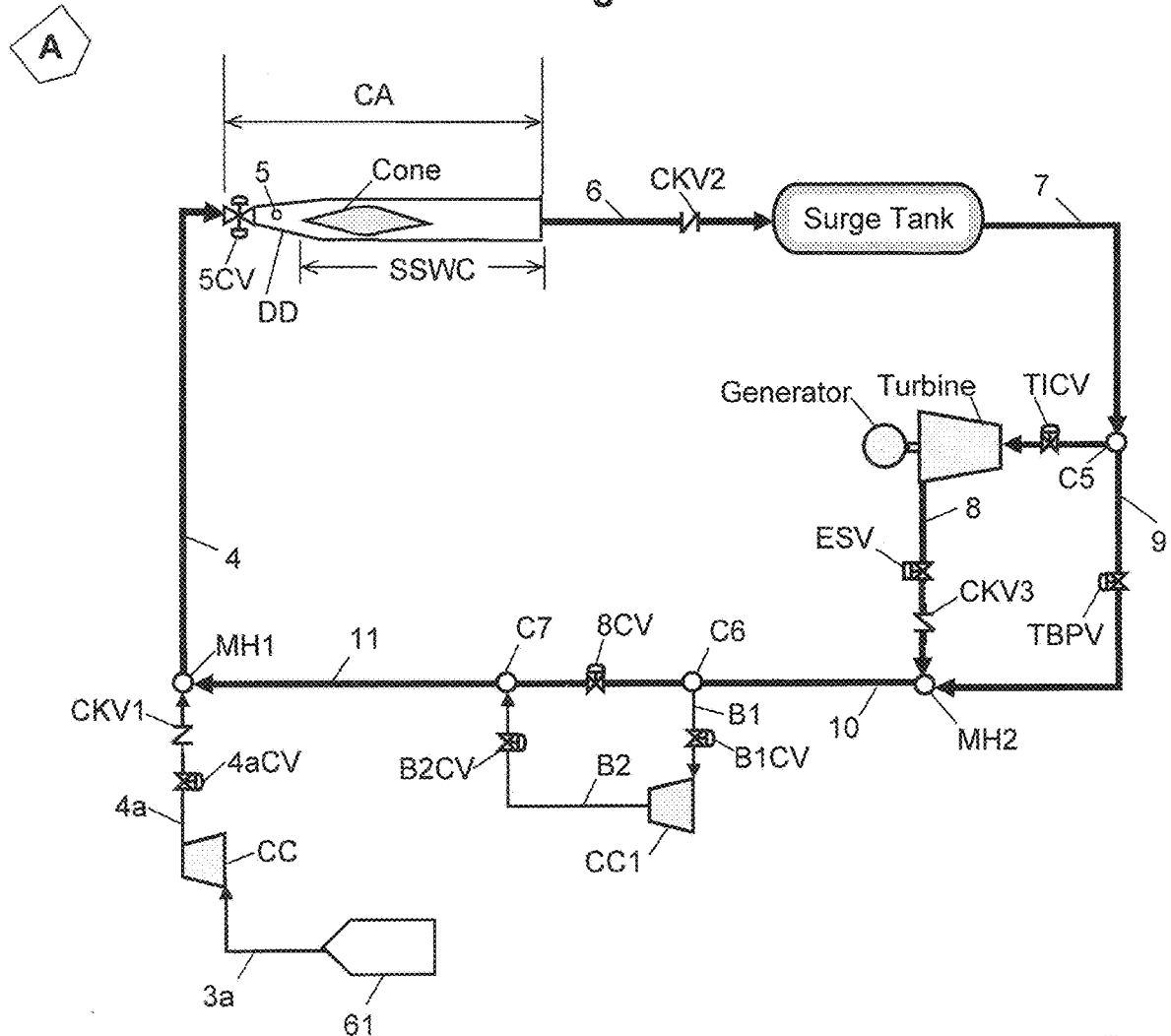
FIG. 4 is a third flow diagram with an alternate heat trapping gas and depicting an alternate startup loop, according to one embodiment of the present invention.

Now attention is drawn to FIG. 4 in which atmospheric air labeled 61 is used as the heat trapping gas. The startup loop consists of compressor CC intake pipe 3a, CC with outlet through line 4a, control valve 4aCV, and check valve CKV1 to header connection MH1 for charging the power loop with flow, pressure, and HOC. After holding at a base load or full load, the startup loop is idle and can be removed from service. The power loop does not require the indirect heat exchanger HX2 shown in FIGS. 1 and 2, since indirect heating or cooling of the air leaving the turbine is not required, and any cooling will be conducted by direct tempering with atmospheric air from CC at MH1. The power produced with atmospheric air can be a similar amount to that produced with $CO_2$ A unique aspect of the present invention is that the renewable energy stationary power plant shown in FIG. 4 includes a startup loop, wherein the startup loop includes a flow stream of atmospheric air which provides a mass flow, a starting pressure, and heat input from a conventional compressor CC heat of compression to a power loop that is operatively connected to the startup loop, and wherein the startup loop continues increasing the mass flow to a vapor compression apparatus located within the power loop until compression is facilitated within the vapor compression apparatus CA and a desired base load is achieved by the cycle.

With respect to the power loop, the power loop includes a vapor compression apparatus CA, wherein the vapor compression apparatus CA includes a velocity choking device 5CV located upstream of an adjustable supersonic shock wave compressor (SSWC) wherein the velocity choking device 5CV transitions air flowing at a subsonic velocity to a supersonic velocity entering the SSWC by isentropically expanding a air flowing at subsonic velocity to supersonic velocity. The power loop also includes a surge tank (Surge Tank), wherein the surge tank is operatively connected to the vapor compression apparatus CA such that the surge tank maintains a sufficient volume of compressed air to minimize pressure fluctuations and large pressure and thermal shocks to a turbine. Finally, the power loop includes a turbine (Turbine), wherein the turbine is operatively connected to the surge tank such that the turbine isentropically expands the air to produce electricity with a shaft-connected generator (Generator).

Figure 5:
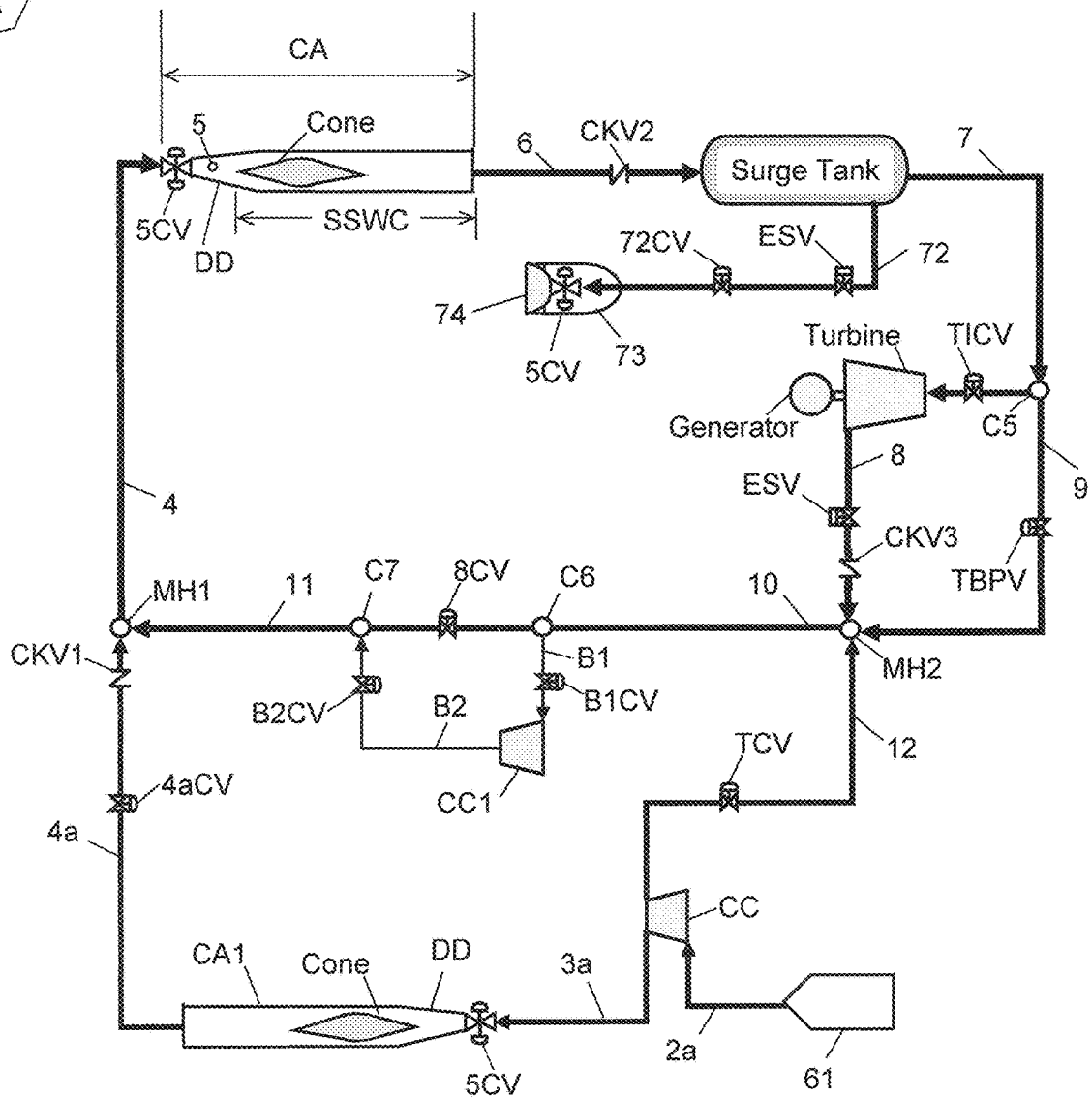
FIG. 5 is a fourth flow diagram similar to the third embodiment but depicting an alternate work for the power loop, according to one embodiment of the present invention.

Now attention is drawn to FIG. 5 in which the startup and power loops are similar to FIG. 4, except flow is diverted from the power loop auxiliary turbine to one or more aircraft engines 73 equipped with a velocity choke control valve 5CV and diversion duct DD labeled as engine exhaust nozzle 74 to produce thrust and motion for a winged subsonic velocity aircraft. Also, FIG. 5 differs from FIG. 4 in that conventional compressor CC and associated piping and valves are part of the power loop to provide makeup air for the air exhausted into the atmosphere from aircraft engine 73. A compressor apparatus CA1 is connected downstream of CC to boost the air pressure and temperature and reduce CC power consumption. Atmospheric air 61 enters CC through line 2a and discharges compressed air through line 3a to compressor apparatus CA1 to further increase air compression. CA1 discharges through line 4a, control valve 4aCV, and check valve CKV1 to mixing header MH1 to combine with any flow from the auxiliary turbine. Also, tempering air is taken from CC through line 12 and tempering control valve TCV to mixing header MH2 to mix with air flow leaving the turbine when cooling is required.

Line 72 is connected to surge tank ST to divert flow from the turbine through control valve 72CV to one or more aircraft engines 73 equipped with a control valve 5CV and nozzle 74. Control valve 5CV converts air flowing at subsonic velocity to supersonic velocity to enter nozzle 74 for further velocity increase and then exits into the atmosphere at supersonic velocity to provide thrust power to the aircraft. Since aircraft engine 73 is exhausting air from the power loop into the atmosphere, one or more additional compression apparatus CA may be added in series to the power loop to further increase air compression pressure and temperature so that the auxiliary turbine-generator can produce sufficient power to operate compressor CC, which is now operating continuously as part of the power loop, along with conventional compressor CC1 operating during startup. Before startup of the auxiliary turbine-generator, a battery pack (not shown) should be included to operate CC and startup compressor CC1, and after start up, the battery pack can be recharged from the auxiliary turbine-generator. Some may prefer that CC be shaft connected to the auxiliary turbine to reduce power consumption.

The aircraft engine 73 depicted in FIG. 5 and described above uses control valve 5CV as depicted in FIG. 3 to control Mach 1 velocity or choke velocity over a load range to transition air flow from subsonic to supersonic velocity and exhaust into the atmosphere through exhaust nozzle 74 to provide thrust for winged subsonic velocity aircraft. Engine 73 can be capable of producing takeoff power depending on the aircraft design and weight. Otherwise, engine 73 can be used as a hybrid for cruising and acceleration together with the aircraft fueled engine to reduce fuel consumption and pollution. The aircraft wings would provide lift and the fueled engine would provide thrust to assist in exceeding the drag forces. Engine 73 can be used in other applications such as glider type aircraft.

A unique aspect of the present invention is that the renewable energy power plant for a subsonic aircraft for auxiliary power and thrust shown in FIG. 5 includes a startup loop, wherein the startup loop includes a conventional compressor CC to restore pressure to the power loop during startup. The renewable energy power plant for a subsonic aircraft for auxiliary power and thrust also includes a power loop, wherein the power loop includes a flow stream of atmospheric air which provides a mass flow, a starting pressure, and heat input from a conventional compressor CC and compression apparatus CC1 heats of compression, and wherein the startup loop continues increasing the mass flow to a vapor compression apparatus CA located within the power loop until compression is facilitated within the vapor compression apparatus CA and thereafter to provide makeup air for the air exhausted from the aircraft engine 73.

Furthermore, the power loop includes a vapor compression apparatus CA, wherein the vapor compression apparatus CA includes a velocity choking device 5CV located upstream of an adjustable supersonic shock wave compressor (SSWC) wherein the velocity choking device 5CV transitions air flowing at a subsonic velocity to a supersonic velocity entering the SSWC by isentropically expanding a air flowing at subsonic velocity to supersonic velocity.

The power loop also includes a surge tank (Surge Tank), wherein the surge tank is operatively connected to the vapor compression apparatus CA such that the surge tank maintains a sufficient volume of compressed air to minimize pressure fluctuations and large pressure and thermal shocks to an auxiliary turbine-generator (Turbine, Generator), wherein the auxiliary turbine-generator is operatively connected to the surge tank such that the turbine isentropically expands the air to produce electricity with a shaft-connected generator, and wherein an aircraft with one or more engines 73 includes a velocity choking device 5CV and exhaust nozzle 74 which are operatively connected to the surge tank such that the air exits to the atmosphere from the exhaust nozzle 74 at supersonic velocity to produce thrust and propel the aircraft forward.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical." "above." "below," "up." "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other modifications and implementations will occur to those skilled in the art without departing from the spirit and the scope of the invention. Accordingly, the description hereinabove is not intended to limit the invention.

I claim:

1. A method of using a renewable energy power plant cycle, wherein the method comprises:
operating a startup loop, wherein the startup loop includes a plurality of flow streams of liquid carbon dioxide ($CO_2$) which provides a mass flow, a starting pressure, and heat input from pump heat of compression to a power loop that is operatively connected to the startup loop, and wherein startup loop continues increasing the mass flow to a vapor compression apparatus located within the power loop until compression is facilitated within the vapor compression apparatus and a desired base load is achieved by the renewable energy power plant cycle; and operating the power loop, wherein the power loop comprises;

operating the vapor compression apparatus, wherein the vapor compression apparatus includes a velocity choking device located upstream of an adjustable supersonic shock wave compressor (SSWC) wherein the velocity choking device transitions $CO_2$ flowing at a subsonic velocity to a supersonic velocity entering the SSWC by isentropically expanding a $CO_2$ gas flowing at subsonic velocity to supersonic velocity, operating a surge tank, wherein the surge tank is operatively connected to the vapor compression apparatus such that the surge tank maintains a sufficient volume of $CO_2$ vapor to minimize pressure fluctuations and minimizes large pressure and thermal shocks to a turbine, and operating the turbine, wherein the turbine is operatively connected to the surge tank such that the turbine isentropically expands the $CO_2$ vapor to produce electricity with a shaft-connected generator, and wherein the $CO_2$ vapor leaving the turbine is not condensed.

2. The method, according to claim 1, wherein the plurality of flow streams of liquid carbon dioxide ($CO_2$) further comprises:

providing a first flow stream by operating a first pump to receive liquid $CO_2$ from a first tank storing $CO_2$ at saturation pressure, such that the first pump then elevates a pressure of the liquid $CO_2$ to a supercritical pressure liquid to produce heat of compression with more enthalpy, then isenthalpically reducing the pressure through a valve for routing to a second pump in series, such that the second pump then elevates a pressure of the liquid $CO_2$ to a supercritical pressure liquid to produce heat of compression at a higher enthalpy for heat transfer to the power loop in a first indirect heat exchanger located upstream of the vapor compression apparatus.

3. The method, according to claim 2, wherein the plurality of flow streams of liquid carbon dioxide ($CO_2$) further comprises:

providing a second flow stream by operating a second pump to receive liquid $CO_2$ from the first tank, such that the second pump elevates the pressure of the liquid $CO_2$ to a supercritical pressure just above a critical pressure for entering into the power loop and the indirect heat exchanger to absorb heat from the first flow stream in order to provide a preliminary starting mass flow, pressure, and temperature to the vapor compression apparatus.

4. The method, according to claim 1, wherein operating the vapor compression apparatus further comprises:

operating a choke valve as the velocity choking device to control a critical pressure ratio and a Mach 1 throat velocity to transition the liquid $CO_2$ flowing at a subsonic velocity to a supersonic velocity entering the SSWC in order to simulate an air speed greater than Mach 1, wherein the choke valve includes a plurality of nozzles that isentropically expand gas flowing at subsonic velocity to supersonic velocity.

5. The method, according to claim 3, wherein the method further comprises:

routing the $CO_2$ vapor leaving the turbine through a second indirect heat exchanger for controlling the temperature of the $CO_2$ vapor; and routing the $CO_2$ vapor to a first mixing header to recombine the $CO_2$ vapor with the second flow stream.

6. The method, according to claim 1, wherein operating the power loop further comprises:

operating a turbine bypass, wherein the turbine bypass is operatively connected between the turbine and a second mixing header such that the turbine bypass ensures that $CO_2$ vapor does not enter the turbine until desired $CO_2$ vapor conditions at an inlet to the turbine are reached.

7. The method, according to claim 5, wherein operating the power loop further comprises:

operating a coolant loop to reduce a temperature of the $CO_2$ vapor leaving the turbine, wherein operating of the coolant loop comprises;

operating a third pump to receive liquid $CO_2$ from a second tank storing $CO_2$ at saturation pressure, routing the liquid $CO_2$ to the second indirect heat exchanger, operating the second indirect heat exchanger to transform the liquid $CO_2$ to a liquid $CO_2$ near saturated conditions, and routing the liquid $CO_2$ to the first tank, operating a heating loop to increase a temperature of the $CO_2$ vapor leaving the turbine, wherein operating the heating loop comprises;

operating the third pump to receive liquid $CO_2$ from the first tank storing liquid $CO_2$ at saturation pressure and elevating a pressure and a temperature of the liquid $CO_2$, routing the liquid $CO_2$ to the second indirect heat exchanger, operating the second indirect heat exchanger to reduce the temperature of the heated liquid $CO_2$ so that the valve reduces the pressure isenthalpically to transform the liquid $CO_2$ to near saturated conditions, and routing the $CO_2$ to the first tank.

8. A method of using a renewable energy power plant cycle, wherein the method comprises:

operating a startup loop, wherein the startup loop includes a flow stream of liquid carbon dioxide ($CO_2$) which provides a mass flow, a starting pressure, and heat input from pump heat of compression to a power loop that is operatively connected to the startup loop, and wherein startup loop continues increasing the mass flow to a vapor compression apparatus located within the power loop until compression is facilitated within the vapor compression apparatus and a desired base load is achieved by the renewable energy power plant cycle; and operating the power loop, wherein the power loop comprises;

operating the vapor compression apparatus, wherein the vapor compression apparatus includes a velocity choking device located upstream of an adjustable supersonic shock wave compressor (SSWC) wherein the velocity choking device transitions $CO_2$ flowing at a subsonic velocity to a supersonic velocity entering the SSWC by isentropically expanding a $CO_2$ gas flowing at subsonic velocity to supersonic velocity, operating a surge tank, wherein the surge tank is operatively connected to the vapor compression apparatus such that the surge tank maintains a sufficient volume of $CO_2$ vapor to minimize pressure fluctuations and minimizes large pressure and thermal shocks to a turbine, and operating the turbine, wherein the turbine is operatively connected to the surge tank such that the turbine isentropically expands the $CO_2$ vapor to produce electricity with a shaft-connected generator, and wherein the $CO_2$ vapor leaving the turbine is not condensed.

9. The method, according to claim 8, wherein the flow stream of liquid carbon dioxide ($CO_2$) further comprises:

providing a flow stream by operating a first pump to receive liquid $CO_2$ from a first storage tank storing $CO_2$ at saturation pressure, such that the first pump then elevates a pressure of the liquid $CO_2$ to a supercritical pressure liquid to produce heat of compression for heat transfer;

routing the pressurized liquid $CO_2$ to a valve, wherein the valve isenthalpically reduces the pressure of the liquid $CO_2$ to create a subcritical saturated mixture of $CO_2$ vapor and liquid;

routing the subcritical saturated mixture to a vapor separator to separate the $CO_2$ vapor;

routing the $CO_2$ vapor from the vapor separator to a first compressor, wherein the $CO_2$ vapor is isentropically compressed;

routing the compressed $CO_2$ vapor to a first mixing header to mix with any vapor from the power loop and then to the vapor compression apparatus; and returning the $CO_2$ liquid from the vapor separator to the first storage tank.

10. The method, according to claim 8, wherein operating the vapor compression apparatus further comprises:

operating a choke valve as the velocity choking device to control a critical pressure ratio and a Mach 1 throat velocity to transition the liquid $CO_2$ flowing at a subsonic velocity to a supersonic velocity entering the SSWC in order to simulate an air speed greater than Mach 1, wherein the choke valve includes a plurality of nozzles that isentropically expand gas flowing at subsonic velocity to supersonic velocity.

11. The method, according to claim 9, wherein the method further comprises:

routing the $CO_2$ vapor leaving the turbine through a second indirect heat exchanger for controlling the temperature of the $CO_2$ vapor;

routing the $CO_2$ vapor leaving the second indirect heat exchanger only during startup to a second compressor, wherein the second compressor restores the pressure and temperature of the $CO_2$ vapor in order to avoid creating a saturated mixture or low temperature vapor entering the SSWC after pressure reduction by the velocity choking valve; and routing the $CO_2$ vapor from the second compressor to a first mixing header to recombine the $CO_2$ vapor with the flow stream.

12. The method, according to claim 8, wherein operating the power loop further comprises:

operating a turbine bypass, wherein the turbine bypass is operatively connected between the turbine and a second mixing header such that the turbine bypass ensures that $CO_2$ vapor does not enter the turbine until desired $CO_2$ vapor conditions at an inlet to the turbine are reached.

13. The method, according to claim 11, wherein operating the power loop further comprises:

operating a coolant loop to control a temperature of the $CO_2$ vapor leaving the turbine, wherein operating the coolant loop comprises:

operating a third pump to receive liquid $CO_2$ from a second tank storing $CO_2$ at saturation pressure, routing the liquid $CO_2$ to the second indirect heat exchanger, operating the second indirect heat exchanger to increase the temperature of the liquid $CO_2$ so that an outlet valve reduces the pressure isenthalpically to transform the $CO_2$ subcooled liquid to near saturated conditions, routing the $CO_2$ to the first tank, operating a heating loop to increase a temperature of the $CO_2$ vapor leaving the turbine, wherein operating the heating loop comprises;

operating the third pump to receive liquid $CO_2$ from the first tank storing liquid $CO_2$ at saturation pressure and elevating a pressure and a temperature of the liquid $CO_2$, routing the liquid $CO_2$ to the second indirect heat exchanger, operating the second indirect heat exchanger to reduce the temperature of the heated liquid $CO_2$ so that the outlet valve reduces the pressure isenthalpically to transform the $CO_2$ liquid to near saturated conditions, and routing the $CO_2$ to the first tank.

14. A renewable energy power plant, comprising:

a startup loop, wherein the startup loop includes a plurality of flow streams of liquid carbon dioxide ($CO_2$) which provides a mass flow, a starting pressure, and heat input from pump heat of compression to a power loop that is operatively connected to the startup loop, and wherein the startup loop continues increasing the mass flow to a vapor compression apparatus located within the power loop until compression is facilitated within the vapor compression apparatus and a desired base load is achieved by the renewable energy power plant cycle; and the power loop, wherein the power loop comprises;

a vapor compression apparatus, wherein the vapor compression apparatus includes a velocity choking device located upstream of an adjustable supersonic shock wave compressor (SSWC) wherein the velocity choking device transitions $CO_2$ flowing at a subsonic velocity to a supersonic velocity entering the SSWC by isentropically expanding a $CO_2$ gas flowing at subsonic velocity to supersonic velocity, a surge tank, wherein the surge tank is operatively connected to the vapor compression apparatus such that the surge tank maintains a sufficient volume of $CO_2$ vapor to minimize pressure fluctuations and minimizes large pressure and thermal shocks to a turbine, and wherein the turbine is operatively connected to the surge tank such that the turbine isentropically expands the $CO_2$ vapor to produce electricity with a shaft-connected generator, and wherein the $CO_2$ vapor leaving the turbine is not condensed.

15. The renewable energy power plant, according to claim 14, wherein the plurality of flow streams of liquid carbon dioxide ($CO_2$) further comprises:

a first flow stream, wherein the first flow stream includes a first set of pumps in series to receive liquid $CO_2$ from a first tank storing $CO_2$ at saturation pressure, such that the first pump set then elevates a pressure of the liquid $CO_2$ to a supercritical pressure liquid to produce heat of compression for heat transfer to the power loop in a first indirect heat exchanger located upstream of the vapor compression apparatus.

16. The renewable energy power plant, according to claim 15, wherein the plurality of flow streams of liquid carbon dioxide ($CO_2$) further comprises:
a second flow stream, wherein the second flow stream includes a second pump to receive liquid $CO_2$ from the first tank, such that the second pump elevates the pressure of the liquid $CO_2$ to a supercritical pressure just above a critical pressure for entering into the power loop and the first indirect heat exchanger to absorb heat from the first flow stream in order to provide a preliminary starting mass flow, pressure, and temperature to the vapor compression apparatus.

17. The renewable energy power plant, according to claim 14, wherein the vapor compression apparatus further comprises:
a choke valve, wherein the choke valve controls a critical pressure ratio and a Mach 1 throat velocity to transition the liquid $CO_2$ flowing at a subsonic velocity to a supersonic velocity entering the SSWC in order to simulate an air speed greater than Mach 1,
wherein the choke valve includes a plurality of nozzles that isentropically expand gas flowing at subsonic velocity to supersonic velocity.

18. The renewable energy power plant, according to claim 16, wherein the renewable energy power plant further comprises:
a second indirect heat exchanger for controlling the temperature of the $CO_2$ vapor; and
a first mixing header to recombine the $CO_2$ vapor with the second flow stream.

19. The renewable energy power plant, according to claim 14, wherein the power loop further comprises:
a turbine bypass, wherein the turbine bypass is operatively connected between the turbine and a second mixing header such that the turbine bypass ensures that $CO_2$ vapor does not enter the turbine until desired $CO_2$ vapor conditions at an inlet to the turbine are reached.

20. The renewable energy power plant, according to claim 18, wherein the power loop further comprises:
a coolant loop to reduce a temperature of the $CO_2$ vapor leaving the turbine, wherein the coolant loop comprises;
a third pump to receive liquid $CO_2$ from a second tank storing $CO_2$ at saturation pressure,
wherein the third pump is operatively connected to the second indirect heat exchanger, and
wherein the second indirect heat exchanger is operatively connected to the first tank.

21. A renewable energy stationary power plant, comprising:
a startup loop, wherein the startup loop includes a flow stream of atmospheric air which provides a mass flow, a starting pressure, and heat input from a conventional compressor heat of compression to a power loop that is operatively connected to the startup loop, and wherein the startup loop continues increasing the mass flow to a vapor compression apparatus located within the power loop until compression is facilitated within the vapor compression apparatus and a desired base load is achieved by the renewable energy power plant cycle; and
the power loop, wherein the power loop comprises;
wherein the vapor compression apparatus includes a velocity choking device located upstream of an adjustable supersonic shock wave compressor (SSWC) wherein the velocity choking device transitions air flowing at a subsonic velocity to a supersonic velocity entering the SSWC by isentropically expanding an air flowing at subsonic velocity to supersonic velocity,
a surge tank, wherein the surge tank is operatively connected to the vapor compression apparatus such that the surge tank maintains a sufficient volume of compressed air to minimize pressure fluctuations and large pressure and thermal shocks to a turbine, and
a turbine, wherein the turbine is operatively connected to the surge tank such that the turbine isentropically expands the air to produce electricity with a shaft-connected generator.

22. A renewable energy power plant for a subsonic aircraft for auxiliary power and thrust, comprising:
a startup loop, wherein the startup loop includes a conventional compressor to restore pressure to a power loop during startup; and
wherein the power loop includes a flow stream of atmospheric air which provides a mass flow, a starting pressure, and heat input from a conventional compressor and a first vapor compression apparatus heats of compression, and continuing to increase the mass flow to a second vapor compression apparatus located within the power loop until compression is facilitated within both vapor compression apparatus and thereafter to provide air to power an auxiliary turbine and makeup air for the air exhausted from an aircraft engine, and
wherein the power loop comprises;
wherein the first vapor compression apparatus includes a velocity choking device located upstream of an adjustable supersonic shock wave compressor (SSWC) wherein the velocity choking device transitions air flowing at a subsonic velocity to a supersonic velocity entering the SSWC by isentropically expanding an air flowing at subsonic velocity to supersonic velocity,
a surge tank, wherein the surge tank is operatively connected to the first vapor compression apparatus such that the surge tank maintains a sufficient volume of compressed air to minimize pressure fluctuations and large pressure and thermal shocks to an auxiliary turbine-generator,
wherein the auxiliary turbine-generator is operatively connected to the surge tank such that the auxiliary turbine isentropically expands the air to produce electricity with a shaft-connected generator, and
wherein an aircraft includes one or more engines each with a velocity choking device and exhaust nozzle which are operatively connected to the surge tank such that the air exits to the atmosphere from the exhaust nozzle at supersonic velocity to produce thrust and propel the aircraft forward.

\* \* \* \* \*